(12) United States Patent
Foege et al.

(10) Patent No.: US 12,117,061 B2
(45) Date of Patent: Oct. 15, 2024

(54) METHOD FOR PRODUCING A FRICTION DISC

(71) Applicant: Miba Frictec GmbH, Laakirchen (AT)

(72) Inventors: Volker Foege, Bad Ischl (AT); Stefan Blaschke, Linz (AT); Johannes Strasser, Desselbrunn (AT); Arun Aher, Pune (IN)

(73) Assignee: Miba Frictec GmbH, Laakirchen (AT)

( * ) Notice: Subject to any disclaimer, the term of this patent is extended or adjusted under 35 U.S.C. 154(b) by 371 days.

(21) Appl. No.: 17/550,016

(22) Filed: Dec. 14, 2021

(65) Prior Publication Data

US 2022/0235840 A1 Jul. 28, 2022

(30) Foreign Application Priority Data

Jan. 27, 2021 (AT) ............................... A 50042/2021

(51) Int. Cl.
*F16D 69/04* (2006.01)

(52) U.S. Cl.
CPC ...... *F16D 69/04* (2013.01); *F16D 2069/0466* (2013.01); *F16D 2069/0491* (2013.01); *F16D 2250/0069* (2013.01); *F16D 2250/0092* (2013.01)

(58) Field of Classification Search
None
See application file for complete search history.

(56) References Cited

U.S. PATENT DOCUMENTS

| 2,062,480 | A | 12/1936 | Stanley |
| 6,381,822 | B1 | 5/2002 | Watanabe et al. |
| 6,479,413 | B1 | 11/2002 | Booher |
| 9,631,689 | B2 | 4/2017 | Steinmetz et al. |
| 2002/0197448 | A1 | 12/2002 | Booher |
| 2017/0114852 | A1* | 4/2017 | Notz ...................... F16D 23/04 |
| 2018/0320746 | A1 | 11/2018 | Hesse |

FOREIGN PATENT DOCUMENTS

| DE | 10 2013 218 111 A1 | 4/2014 |
| DE | 102018124338 A1 * | 5/2019 |
| EP | 0 867 634 A2 | 9/1998 |
| EP | 1 602 851 A1 | 12/2005 |
| JP | 2000-027914 A | 1/2000 |
| WO | 2017/092744 A1 | 6/2017 |

OTHER PUBLICATIONS

C. Trevisiol, A. Jourani & S. Bouvier; ScienceDirect—Wear: Effect of hardness, microstructure, normal load and abrasive size on friction and on wear behaviour of 35NCD16 steel. (388-389, pp. 101-111, 2017) journal homepage: www.elsevier.com/locate/wear (Year: 2017).*
Machine translation DE102018124338A1 (Year: 2019).*

* cited by examiner

*Primary Examiner* — Jacob T Minskey
*Assistant Examiner* — Wayne K. Swier
(74) *Attorney, Agent, or Firm* — Collard & Roe, P.C.

(57) ABSTRACT

A method for producing a friction disc includes the steps: providing a carrier element, providing at least one friction lining; connecting the friction lining to the carrier element by an adhesive agent to form a composite material, wherein the carrier element is connected to the friction lining to form the composite material before the geometry of the friction disc is determined.

16 Claims, 4 Drawing Sheets

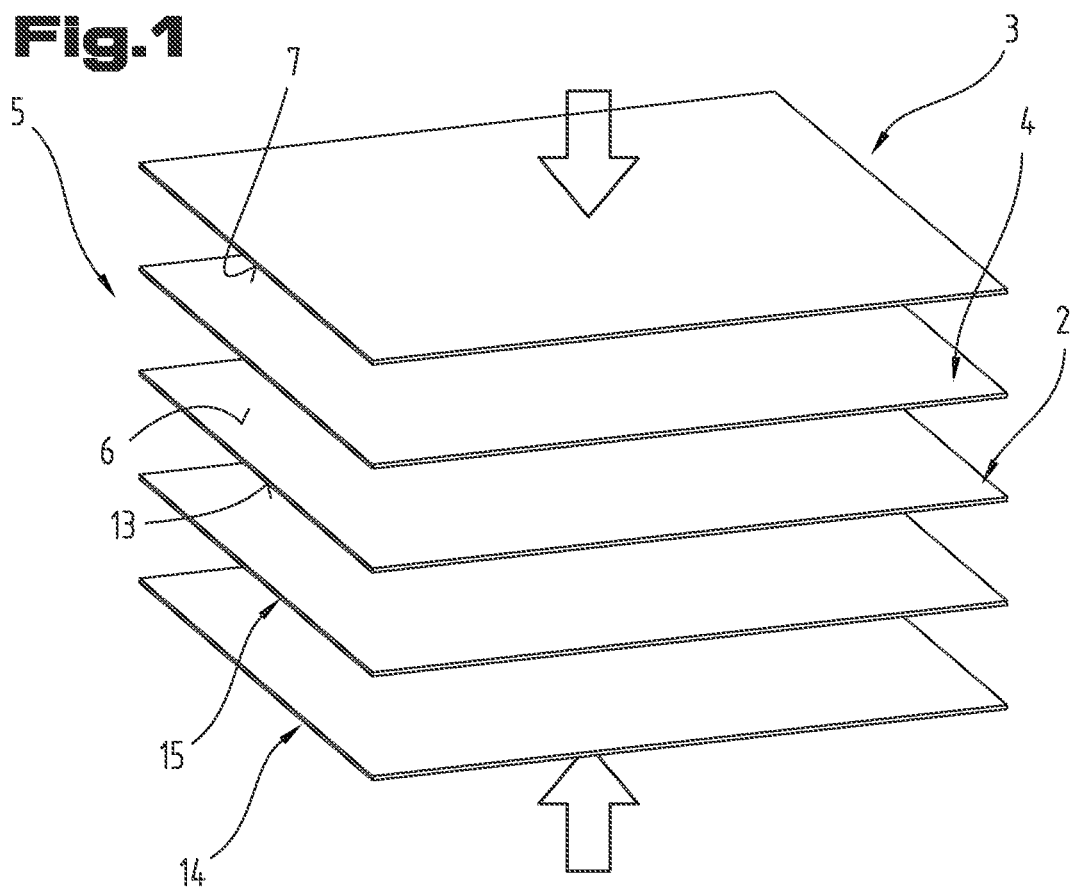
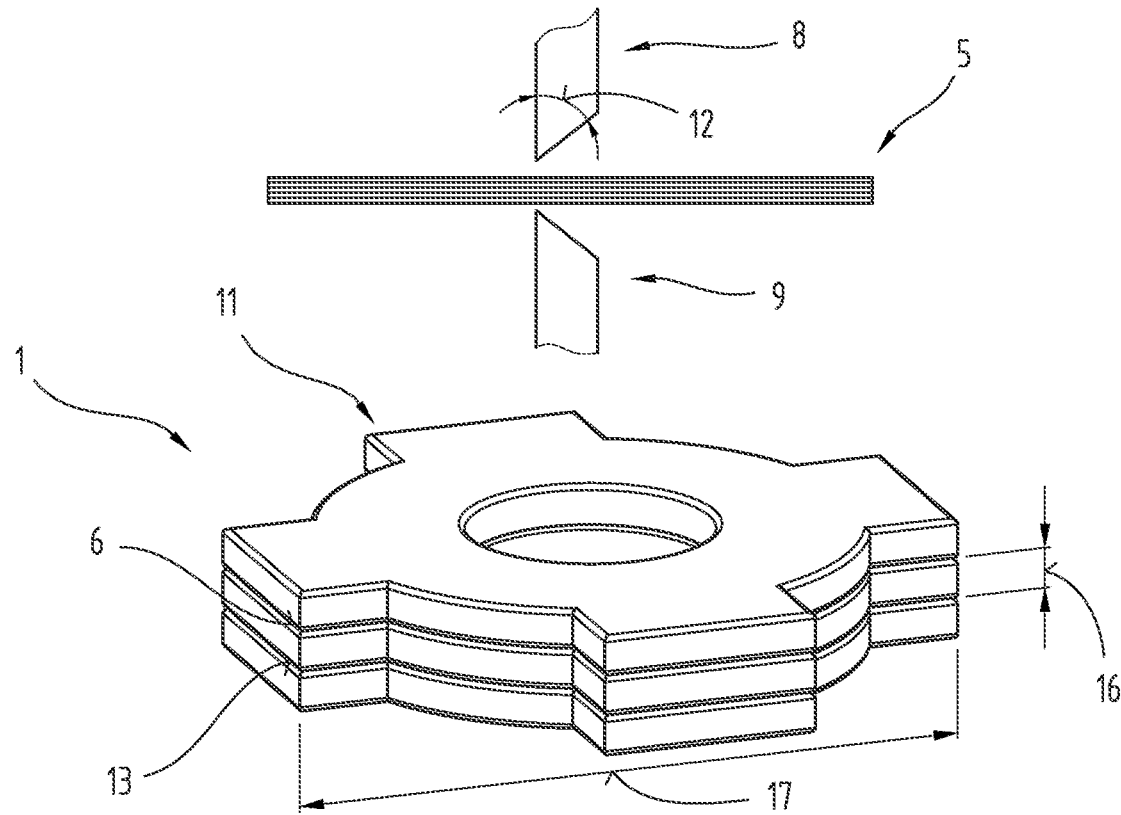

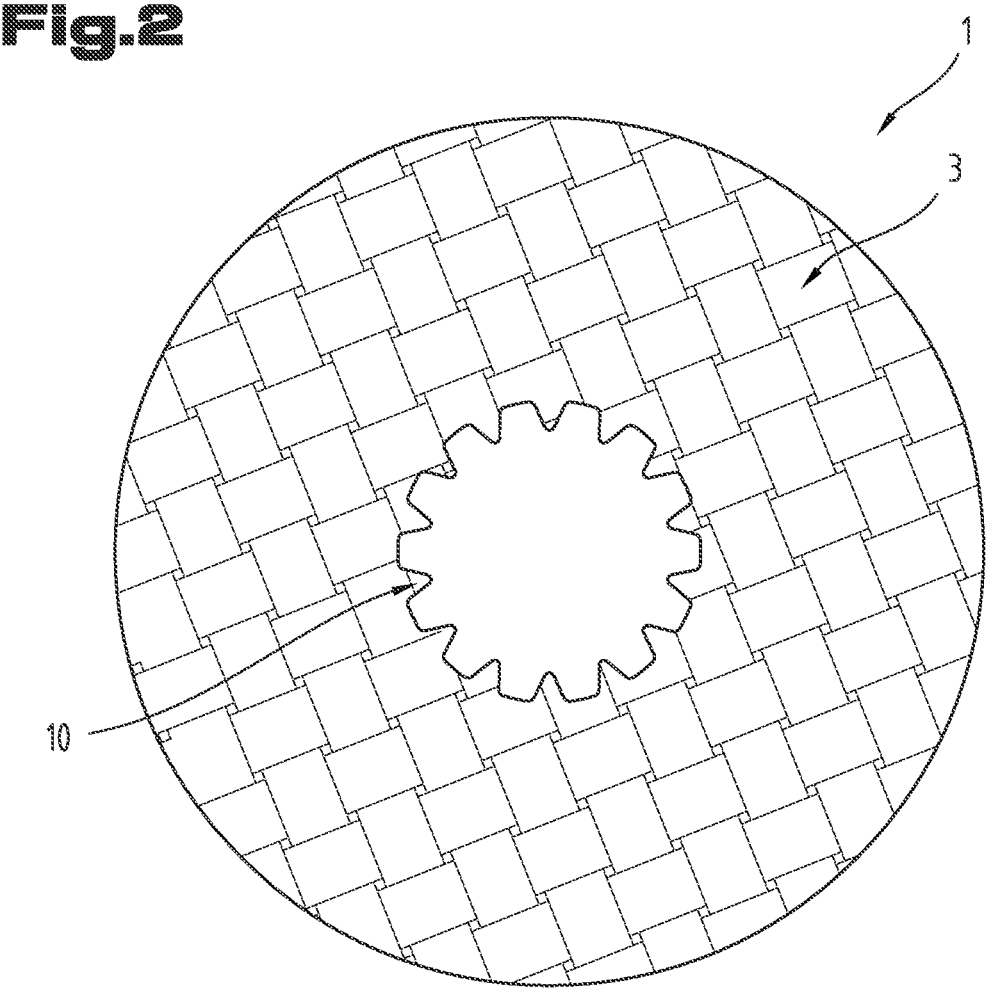

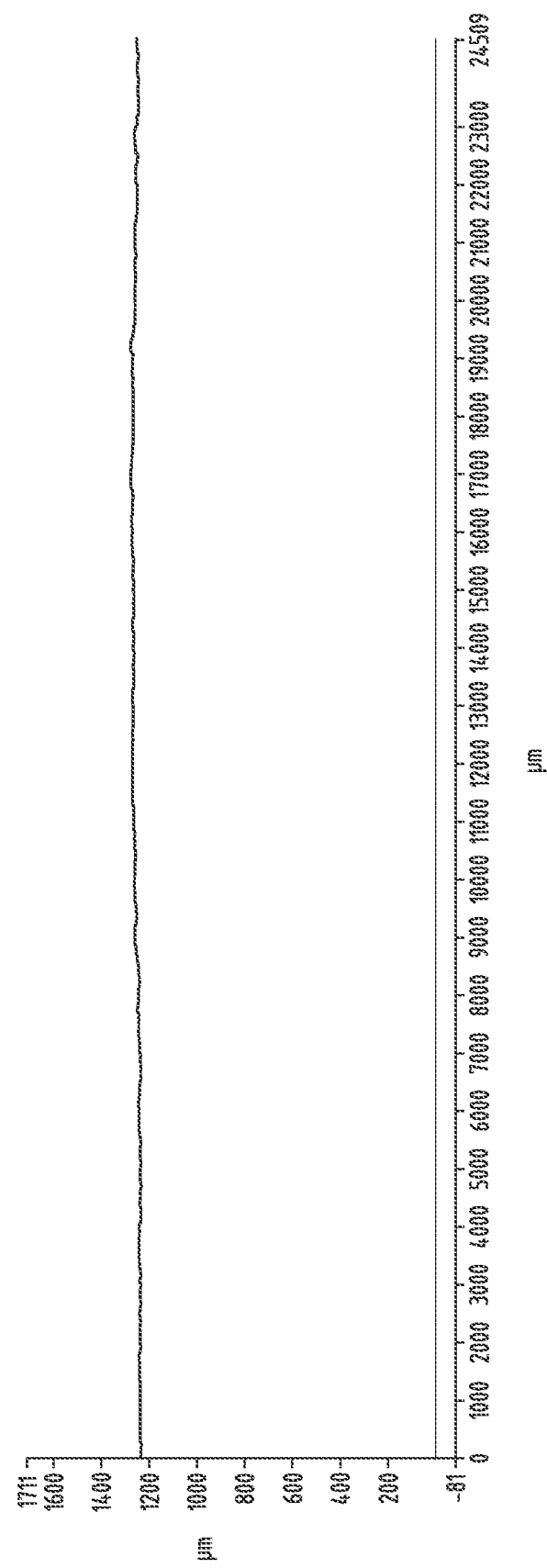

METHOD FOR PRODUCING A FRICTION DISC

CROSS REFERENCE TO RELATED APPLICATIONS

Applicant claims priority under 35 U.S.C. § 119 of Austrian Application No. A50042/2021 filed Jan. 27, 2021, the disclosure of which is incorporated by reference.

BACKGROUND OF THE INVENTION

1. Field of the Invention

The invention relates to a method for producing a friction disc comprising the steps: providing a carrier element, providing at least one friction lining and connecting the friction lining to the carrier element by means of an adhesive agent to form a composite material.

The invention further relates to a friction disc comprising a carrier element and at least a friction lining, which is connected to the carrier element by means of an adhesive agent to form a composite material.

2. Description of the Related Art

Nowadays, friction discs are produced, inter alia, such that a carrier disc is punched out and a friction lining is subsequently glued onto said carrier disc. Subsequently, the processing of the friction disc is completed. The carrier disc thus already has its final form before the friction lining is glued on. Thus, the friction lining also has to have its final form before it is glued on. The same applies to the adhesive agent intermediate layer if the adhesive agent used is not liquid.

However, there are also alternative methods which attempt to combine individual method steps. For example, WO 2017/092744 A1 describes a method for mounting friction lining elements on a friction lining carrier, wherein the friction lining elements are punched out of a friction lining and are bonded with the friction lining carrier by means of an adhesive film. The adhesive film can be punched out together with the friction lining elements and be supplied to the friction lining carrier. Moreover, the adhesive film can be applied to the friction lining or the friction lining carrier before the friction lining elements are punched out.

From DE 10 2013 218 111 A1, a method for mounting friction lining elements on a friction lining carrier is known, in which friction lining elements are applied to two opposite sides of the friction lining carrier simultaneously. The friction lining elements may be punched out of semi-finished friction linings before or while the friction lining elements are applied to the opposite sides of the friction lining carrier. The friction lining carrier may be provided with a base adhesive coating on both sides prior to the application of the friction lining elements.

These methods have proven successful when so-called friction lining pads are glued to the carrier.

SUMMARY OF THE INVENTION

The invention is based on the object to provide an improved method for producing friction discs as well as a correspondingly produced friction disc.

In the initially mentioned method, the object of the invention is achieved in that the carrier element is connected to the friction lining to form the composite material before the geometry of the friction disc is determined.

The object of the invention is further achieved by the initially mentioned friction disc, which is produced from the composite material by means of a cutting separation method.

The advantage in this is that using a technologically relatively simple method, friction discs can be produced in a relatively short time and thus also at a lower cost. Although the advantages of the method in respect of production tolerances primarily apply to smaller friction discs, it is easily scalable due to its simplicity and can therefore also be used for larger friction discs. Additionally, it is also easily adaptable to various different geometries of friction discs as essentially, only the tool for determining the geometry of the friction disc has to be adapted. The entire production process taken place before, however, can remain the same. This allows a swift adjustment of production for changing friction disc geometries. Surprisingly, the friction discs produced this way have relatively low tolerances in respect of the thickness and the density.

According to an embodiment variant of the invention, it may be provided that a carrier element is used which has a Vickers hardness (ISO 6507 2018) of at least 140 HV10. The friction lining thereby receives better support upon the determination of the geometry by means of the carrier element, whereby the aforementioned effects can be further improved. Additionally, the tool for producing the friction disc can be simplified thereby, which is also due to the better support of the friction disc by means of the carrier element.

According to further embodiment variants, it may be provided that a metallic or non-metallic surface element is used as a carrier element, wherein the metallic surface element consists of a metallic material, which is preferably selected from a group comprising aluminum-based materials, iron-based materials, copper-based materials, magnesium-based materials, titanium-based materials, or wherein the non-metallic surface element consists of a non-metallic material, which is preferably selected from a group comprising kraft paper, plastics, carbon-based materials, composite materials, such as fiber-reinforced thermoplastics, fiber-reinforced thermosets.

Preferably, the geometry of the friction disc is determined by a cutting separation method, in particular, according to a further embodiment variant of the invention, by punching or cutting. It is thus possible to shorten the production times of the friction disc, whereby correspondingly high cycle times can be achieved. Additionally, the tools have a simple design and are relatively easy and quick to adapt to different friction disc geometries by having corresponding tool inserts available.

According to a further preferred embodiment variant of the invention, it may be provided that the cutting separation method is the last working step in the production of the friction disc. The friction disc can thus be produced in an essentially off-tool manner, whereby the aforementioned effects of cost reduction and the short cycle times can be further improved.

The aforementioned effects are even more pronounced when the friction disc does not only have a friction lining on one side but if, according to further embodiment variants of the invention, on the surface of the carrier element facing away from the first friction lining, a further friction lining is connected to the carrier element by means of an adhesive agent, and if preferably, the further friction lining is arranged on the carrier element before the geometry of the friction lining is determined.

According to a different embodiment variant of the invention, it may also be provided that multiple composite materials comprising the carrier element, the adhesive agent, and the friction lining are arranged on top of one another, and that afterwards, the geometry of multiple friction discs is determined together. Thus, the production of multiple friction discs in one working step is possible, whereby the productivity of the method can be improved further.

In this regard, it may also be provided according to an embodiment variant that at least individual ones of the multiple composite materials arranged on top of one another, in particular all composite materials arranged on top of one another, are also provided with the further friction lining. Hence, two friction linings are present between two carrier elements in the tool, whereby a better adaptation to surface roughnesses can be achieved. This, in turn, favors the formation of relatively low thickness and density tolerances.

Although the method is universally suitable for friction discs of highly diverse geometries, the advantages of the method are particularly pronounced—as mentioned before—in smaller friction discs. For this reason, it may be provided according to further embodiment variants of the invention that the carrier element has a carrier element thickness of 0.3 mm to 5 mm, and/or that the carrier element has an outer diameter of 15 mm to 200 mm.

In this regard, it is further preferred if the carrier element and the friction lining or the friction linings have the same areal extent and the same geometry, in each case as seen in a top view, whereby a corresponding simplification of the method can be achieved as a partial upfront confectioning of the friction lining and/or the friction linings is omitted completely.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 1 shows a schematic representation of a course of the method for producing a friction disc;

FIG. 2 shows a top view of a friction disc produced according to the method of the invention;

FIG. 3 shows the result of the measuring of the flatness of a friction disc produced according to the method of the invention;

DETAILED DESCRIPTION OF PREFERRED EMBODIMENTS

Figure 4:
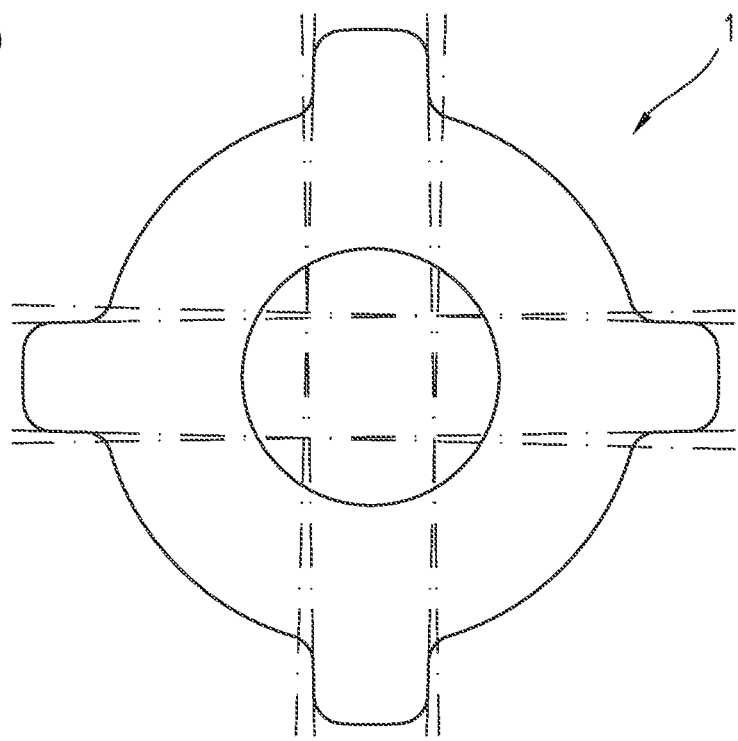
FIG. 4 shows a friction disc according to the prior art in a top view.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

It is further pointed out that information on standards refer to the last valid version at the date of filing of the present application unless something else is explicitly stated.

In FIG. 1, a course of a method for producing a friction disc 1, particularly a flat one, is shown schematically. In this regard, the "in particular a flat one" relates to the fact that the friction disc 1 could still be reshaped in a final step, for example into a cone shape.

The method comprises the steps providing a carrier element 2, providing at least one friction lining 3, and connecting the friction lining 3 to the carrier element 2 by means of an adhesive agent 4 to form a composite material 5. The friction lining 3 is arranged on the front side surface 6 of the carrier element 2.

The carrier element 2 and the friction lining 3 are provided as surface elements, for example with a rectangular or square or a different shape, as it is shown in FIG. 1. The surface elements thus form the semi-finished product for the production of the friction disc 1. The surface elements may be separated from larger units, for example from raw material reels or raw material sheets, for example by cutting or punching.

In the finished friction disc 1, the carrier element 2 may also be referred to as carrier disc. Furthermore, the friction disc 1 can also be referred to as a so-called lining disc.

The surface elements of the carrier element 2 and of the friction lining 3 have a size which is geared to the friction disc 1 to be produced. Thus, the amount of waste can be reduced. For example, the composite material 5 may have an areal extent, which is between 0.1% and 25%, in particular between 2% and 20%, larger than the areal extent of the friction disc 1, in each case as seen in a top view onto the end face.

Preferably, only one friction disc 1 is produced from a semi-finished product (surface element) and/or from a composite material 5 formed thereof. Within the context of the invention, however, it is also possible that the semi-finished products (surface elements) have a size allowing multiple friction discs 1, for example two or three or four or five etc., to be produced therefrom in one working step. It is thus possible to reduce the relative proportion of waste.

For the production of the composite material 5, the carrier element 2 is preferably cleaned and activated before the friction lining 3 is arranged thereon. The cleaning can be carried out mechanically by means of conventional methods and/or chemically (e.g. by means of solvents) and/or physically, e.g. by means of a plasma. The activation of the surface(s) 6 of the carrier element 2 may be carried out in accordance with the prior art, for example chemically, e.g. by means of a stripper, or physically, e.g. by means of a plasma. Likewise, the surface may, for example, be sandblasted.

For the connection between the carrier element 2 and the friction lining 3, the adhesive agent 4 is used. The adhesive agent 4 may be applied to the surface 6 of the carrier element 2 and/or to a surface 7 of the friction lining 3 as a non-cured precursor. For example, the adhesive agent may be liquid or gel-like or paste-like and be spread on or sprayed on or applied by immersion. However, it is also possible to use the adhesive agent 4 in the form of an adhesive film.

Subsequently, the adhesive agent 4 is cured, for example chemically by means of an activator, or physically, for example by means of UV radiation, or thermally.

For example, liquid adhesives and adhesive films with a phenol-formaldehyde resin base, epoxy resin-based adhesives may be used as an adhesive agent 4.

With the curing/cross-linking of the adhesive agent 4, the surface element of the friction lining 4 is bonded with the surface element of the carrier element 2. In this regard, the bond strength is equivalent to that of the finished friction disc 1. Preferably, a pressing to dimension takes place with the curing/cross-linking and the desired porosity of the friction material is adjusted.

Subsequently, the friction disc 1 is separated from the thus-formed composite material 5, i.e. the final geometry (the contour) of the friction disc 1 is determined.

Generally, any suitable method for determining the geometry of the friction disc 1 from the composite material 5 may be used. However, in the preferred embodiment variant of the invention, the determination of the geometry is carried out by means of a cutting separation method, in particular punching or cutting. As a representation for this, a punching tool 8 is adumbrated in FIG. 1.

The punching tool 8 and/or generally the cutting tool or separating tool may comprise cutting edges 9 on top and bottom (i.e. on both sides of the composite material 5), as it is adumbrated in FIG. 1. However, it is also possible that the punching tool 8 (and/or the cutting tool) is provided with cutting edges 9 only on top or only on the bottom.

As punching and/or cutting is known per se, no further explanations in this regard are required. In this respect, reference is made to the tool relevant prior art.

The cutting edges 9 are designed corresponding to the contour of the friction disc 1, for example as a cylinder. Should drivers be formed on the inner or outer circumference of the friction disc 1, such as for example an internal toothing 10 or external toothing, or lugs 11 jutting outward and/or inward, the circle geometry of the cutting edges 9 is also changed accordingly.

According to an embodiment variant of the invention, it may be provided that the cutting edges 9 of the punching tool 8 and/or of the cutting tool or separating tool have a cutting angle 12 of 0° to 10°, in particular between 0.1° and 2.5°. Thus, a densification of the friction lining 3 when separating the friction disc 1 made from the composite material 5 can be better avoided, whereby the density tolerance of the friction lining 3 can be reduced. However, the cutting tool may also have a different cutting angle 12 (e.g. of up to 90°).

In the case of cutting edges 9 arranged on top and bottom, they may have different cutting angles 12, for example, the cutting edges 9 arranged on the bottom may be more blunt than the cutting edges 9 arranged on top.

It is further possible to design the cutting edges 9 of the punching tool 8 and/or cutting tool or separating tool as multiple pieces or as one piece. The punching tool 8 may be a composite tool or a progressive tool.

During the separation of the friction disc 1 made from the composite material 5, the material is held in a clamping tool that is not shown. The clamping tool may be designed according to the prior art.

As explained above, the friction disc 1 is preferably off-tool, meaning that the separating of the friction disc 1 made from the composite material 5 is the last working step in the production of the friction disc.

Generally, however, a post-processing is possible, for example a post-confectioning.

According to a preferred embodiment variant, a material is used for the carrier element 2, which has a Vickers hardness (ISO 6507:2018) of at least 140 HV 10, in particular a Vickers hardness of between 140 HV 10 and 350 HV 10, preferably between 200 HV 10 and 260 HV 10. In this regard, the carrier element 2 may have this hardness only on the surface and in the adjacent regions or in its entirety.

A metallic or non-metallic surface element may be used as the carrier element 2. The metallic surface element may consist of a metallic material, which is selected from a group comprising aluminum-based materials, iron-based materials such as steel, stainless steel, copper-based materials such as brass, bronze, magnesium-based materials, titanium-based materials, etc.

In this regard, the term "based" comprises the respective metal itself as well as alloys thereof, wherein, in this case, the respective metal has the matrix material and/or the constituent of the alloy with the greatest proportion with respect to the individual proportions of the further constituents of the alloy.

The non-metallic surface element may consist of a non-metallic material, which is selected from a group comprising kraft papers, plastics such as polyethylene (PE), polypropylene (PP), polyamides (PA), polyoxymethylene (POM), polyvinyl chloride (PVC), carbon-based materials, composite materials such as fiber-reinforced thermoplastics, fiber-reinforced thermosets.

The friction lining 3 may, in particular, be a so-called paper lining, i.e. a resin-impregnated composite lining. Other resin-impregnated fibers and/or fiber-reinforced composites may also be used. Carbon fibers, aramid fibers, etc. are mentioned here as fibers. A phenolic resin may be used as a resin, for example. Preferably, woven fiber composite friction linings 3 and friction linings 3 having a high proportion of fibrillated fibers and a high filler content (e.g. Celite, graphites, coke, activated carbon, etc.) are used. FIG. 2 shows, by way of example, a friction disc 1 with a woven, resin-impregnated fiber-based friction lining 3.

As such friction linings are generally known from the prior art, reference be made thereto for the avoidance of repetitions.

The friction lining 3 is particularly not a sintered friction lining.

According to a further embodiment variant of the method, it may be provided that a further friction lining 14 is connected to the carrier element 2 by means of an adhesive agent 15 on a surface 13 of the carrier element 2 facing away from the first friction lining. Preferably, this further friction lining 14 is also arranged on the carrier element 2 before the geometry of the friction disc 1 is determined. In other words, preferably, a friction disc 1 provided with a friction lining 3, 14 on both sides is produced from the composite material 5, for which purpose the composite material 5 is produced, according to the above explanations, by laying the individual surface elements for the carrier element 2 and the friction linings 3, 14 and possibly the adhesive agents 4, 15 on top of one another, and subsequently connect them in a materially bonded manner.

In respect of the further friction lining 14 and the adhesive agent 15, reference is made to the above explanations regarding the friction lining 3 and the adhesive agent 4.

The further friction lining 14 can be the same as or different from the friction lining 3. Likewise, the adhesive agent 4 can be the same as or different from the further adhesive agent 15.

In the case of different friction linings 3, 14, the further friction lining 14 may also be a sintered friction lining, which may possibly be sintered onto the surface 13 of the carrier element 2 directly, i.e. without an adhesive agent 15.

As already explained, the composite material 5 may have a size allowing one or multiple friction discs 1 to be produced therefrom. As an alternative or an addition thereto, it may be provided according to a further embodiment variant of the method that multiple composite materials 5 are put on top of one another, from this stack of composite materials 5, multiple friction discs 1 are separated simultaneously. Possibly, a separating layer, e.g. a separating paper, may be provided between the composite materials.

In this regard, it may be provided that all composite materials 5 are designed the same or at least individual ones are designed differently. For example, composite materials, which all comprise the friction linings 3 and the further friction linings 14, may be used. However, a combination of composite materials 5, of which individual ones comprise only the friction lining 3 and the remaining ones comprise the friction lining 3 and the further friction lining 14, is also possible.

Figure 5:
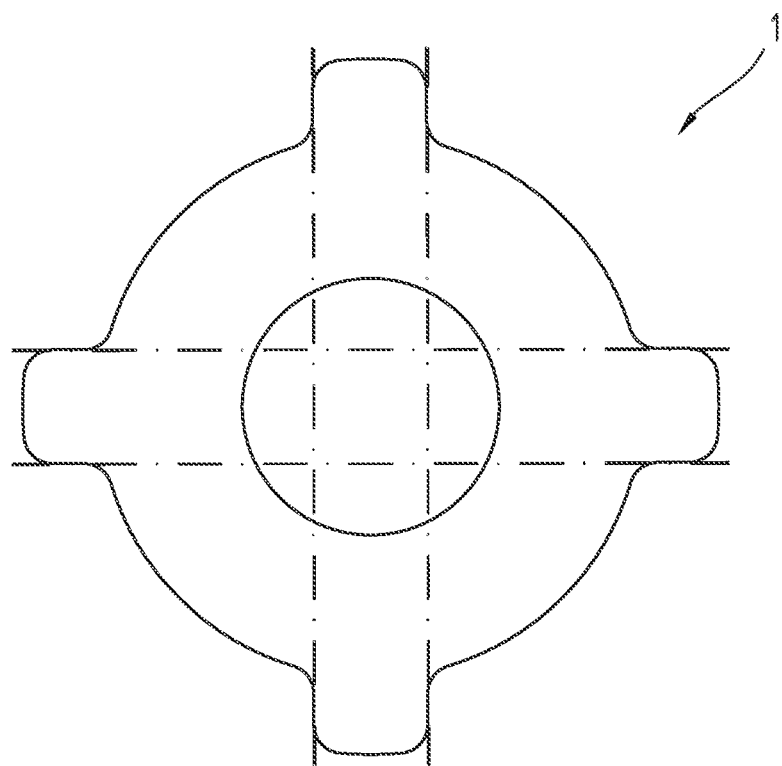
FIG. 5 shows a friction disc with the geometry of the friction disc according to FIG. 4 and produced according to the method of the invention.

With the method, friction discs 1 of a variety of geometries can be produced. The friction discs 1 shown in FIGS. 1, 2 and 5 are therefore to be understood only as an example and not in a limiting way.

With the method described, a (flat) friction disc 1 can be produced, comprising the carrier element 2 and at least one friction lining 3, 14, which is/are connected to the carrier element 2 by means of an adhesive agent 4, 15 to form the composite material 5, wherein the friction disc is produced from the composite material 5 by means of a cutting separation method.

The friction disc 1 preferably has a carrier element 2, which has a carrier element thickness 16 of between 0.3 mm and 5 mm, in particular between 0.5 mm and 2 mm.

According to a further embodiment variant, it is preferred if the carrier element has an outer diameter 17, which amounts to between 15 mm and 200 mm, in particular between 0.18 mm and 50 mm. In this regard, the outer diameter is the maximum diameter of the enveloping circle, which only just encloses the friction disc 1, i.e. for example on the outer edge of the lugs 11 if the friction disc comprises such drivers.

In the preferred embodiment variant of the invention, the carrier element 2 and the friction lining 3 or the friction linings 3, 14 have the same areal extent and the same geometry, in each case as seen in a top view, as can be seen from FIGS. 1, 2 and 5. This means that the friction lining(s) 3, 14 are also arranged on the drivers, such as the internal toothing 10 (FIG. 2) or the lugs (FIG. 1).

Furthermore, the friction lining(s) 3, 14 are preferably formed as one piece.

Should an at least partial pressing of the friction lining 3 or of the friction linings 3, 14 be desired, it could possibly be carried out contemporaneously with the separation of the friction lining 1 made from the composite material 5.

The friction disc 1 may particularly be used for holding brakes in an automatically/electrically driven trunk lid,— tailgates, vehicle doors, etc. It may also be used for other applications of conventional friction discs (e.g. differential locks, hang-on systems, etc.).

From FIG. 3, it can be seen that using the method, friction discs 1 can be produced, which have a very low thickness tolerance. For this purpose, a friction disc 1 was produced from a non-woven fiber composite coating with a 0.5 mm steel carrier (C45) according to the previously described method. In the diagram shown in FIG. 3, the outer diameter is plotted on the X-axis and the thickness of the friction disc is plotted on the Y-axis, in each case given in μm. It can be seen that the thickness of the friction disc 1 fluctuates only slightly. In other words, the friction disc 1 has a flatness with a low tolerance.

FIG. 4 or 5 show a friction disc 1 according to the prior art (FIG. 4) and a friction disc 1 produced according to the described method (FIG. 5). In principle, both friction discs 1 have the same geometry. However, the symmetry of the friction disc 1 produced according to the described method (FIG. 5) is significantly better than the one according to the prior art. For this, the carrier element 2 and the two friction linings 3, 14 were each punched into shape before being connected, and only afterwards, the friction linings 3, 14 were glued onto the carrier element 2.

The exemplary embodiments show possible embodiment variants, while it should be noted at this point that combinations of the individual embodiment variants are also possible.

Finally, as a matter of form, it should be noted that for ease of understanding of the structure of the friction disc 1, elements thereof are not necessarily depicted to scale.

Although only a few embodiments of the present invention have been shown and described, it is to be understood that many changes and modifications may be made thereunto without departing from the spirit and scope of the invention.

| List of reference numbers | |
|---|---|
| 1 | Friction disc |
| 2 | Carrier element |
| 3 | Friction lining |
| 4 | Adhesive agent |
| 5 | Composite material |
| 6 | Surface |
| 7 | Surface |
| 8 | Punching tool |
| 9 | Cutting edge |
| 10 | Internal toothing |
| 11 | Lug |
| 12 | Cutting angle |
| 13 | Surface |
| 14 | Friction lining |
| 15 | Adhesive agent |
| 16 | Carrier element thickness |
| 17 | Outer diameter |

The invention claimed is:

1. A method for producing a friction element, comprising the steps:
   providing a carrier element,
   providing at least a first friction lining;
   connecting the first friction lining to the carrier element by an adhesive agent to form a composite material,
   wherein the first friction lining for the connection to the carrier element is arranged on the carrier element and the carrier element is connected to the first friction lining to form the composite material before the geometry of the friction element is determined;
   wherein the carrier element and the first friction lining are produced with an identical areal extent and an identical geometry, as seen in a top view; and
   wherein the friction element is produced as a friction disc, the friction disc having internal teeth on an inner circumference or external teeth on an outer circumference or lugs protruding on an inside of the friction disc, an outside of the friction disc, or on the inside and the outside of the friction disc.

2. The method according to claim 1, wherein a carrier element is used which has a hardness of at least 140 HV10.

3. The method according to claim 1, wherein a metallic or non-metallic surface element is used as the carrier element.

4. The method according to claim 3, wherein the metallic surface element comprises a metallic material, which is selected from a group consisting of aluminum-based materials, iron-based materials, copper-based materials, magnesium-based materials, and titanium-based materials.

5. The method according to claim 3, wherein the non-metallic surface element comprises a non-metallic material, which is selected from a group consisting of kraft papers, plastics, carbon-based materials, and composite materials.

6. The method according to claim 1, wherein the geometry of the friction disc is determined by a cutting separation method.

7. The method according to claim 6, wherein punching or cutting is carried out as the cutting separation method.

8. The method according to claim 6, wherein the cutting separation method is the last working step in the production of the friction disc.

9. The method according to claim 1, wherein a further friction lining is connected to the carrier element by an adhesive agent on a surface of the carrier element facing away from the first friction lining.

10. The method according to claim 9, wherein the further friction lining is arranged on the carrier element before the geometry of the friction disc is determined.

11. The method according to claim 1, wherein multiple composite materials comprising the carrier element, the adhesive agent, and the first friction lining are arranged on top of one another, and wherein afterwards, the geometry of multiple friction discs is determined together.

12. The method according to claim 11, wherein at least individual ones of the multiple composite materials arranged on top of one another are also provided with the further friction lining.

13. A friction disc comprising:
a carrier element, and
at least one friction lining, which is connected to and arranged on the carrier element (2) by an adhesive agent to form a composite material,
wherein the friction disc made from the composite material is produced by a cutting separation method;
wherein the carrier element and the at least one friction lining have an identical area extent and an identical geometry, as seen in a top view; and
wherein the friction disc has internal teeth on an inner circumference or external teeth on an outer circumference or lugs protruding on an inside of the friction disc, an outside of the friction disc, or on the inside and the outside of the friction disc.

14. The friction disc according to claim 13, wherein the carrier element has carrier element thickness of between 0.3 mm and 5 mm.

15. The friction disc according to claim 13, wherein the carrier element has an outer diameter of between 0.15 mm and 200 mm.

16. The method according to claim 11, wherein all composite materials arranged on top of one another are provided with the further friction lining.

* * * * *